(No Model.)

J. G. McKETHAN.
HAND FERTILIZER DISTRIBUTER.

No. 446,787. Patented Feb. 17, 1891.

Witnesses:
E. P. Ellis,
R. Brockett,

Inventor
Jno. G. McKethan,
per
Lehmann & Pattison,
Attys.

UNITED STATES PATENT OFFICE.

JOHN G. McKETHAN, OF ARCADIA, LOUISIANA.

HAND FERTILIZER-DISTRIBUTER.

SPECIFICATION forming part of Letters Patent No. 446,787, dated February 17, 1891.

Application filed October 17, 1890. Serial No. 368,409. (No model.)

*To all whom it may concern:*

Be it known that I, JOHN G. MCKETHAN, of Arcadia, in the parish of Bienville and State of Louisiana, have invented certain new and useful Improvements in Hand Fertilizer-Distributers; and I do hereby declare the following to be a full, clear, and exact description of the invention, such as will enable others skilled in the art to which it pertains to make and use it, reference being had to the accompanying drawings, which form part of this specification.

My invention relates to an improvement in hand fertilizer-distributers; and it consists in the combination and construction of parts which will be fully described hereinafter.

The object of my invention is to provide an implement for distributing cotton-seed meal and other fertilizers by hand, and which implement can be used like a walking-cane for dropping the fertilizer at every step.

Figure 1:
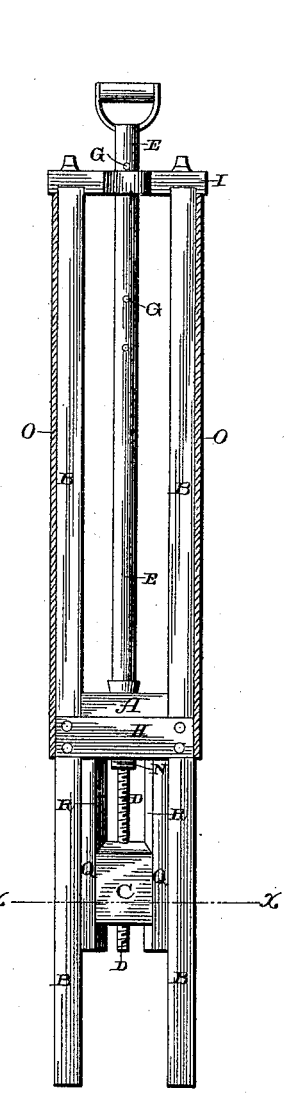
Figure 3:
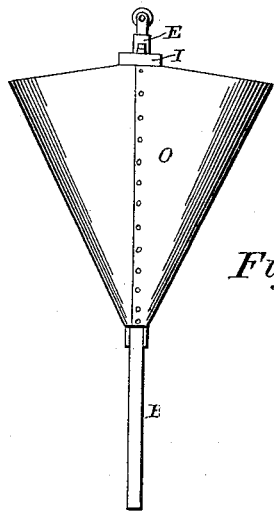
Figure 2:
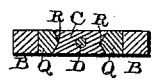

Figure 1 is a side elevation of a device which embodies my invention, the hopper being shown in section. Fig. 2 is a cross-section taken on the dotted line X X of Fig. 1. Fig. 3 is a side elevation of a distributer embodying my invention.

O represents the hopper, which may either be of the shape here shown or any other that may be preferred, and in which the fertilizer is placed. Extending down through this hopper O are the two vertical guides B, to which the hopper is rigidly secured at its lower end, and which guides are rigidly secured together at their upper ends by the cross-piece and guide I and at any suitable point below their center by the cross-pieces H.

Extending down through the cross-piece I is the vertically-moving rod E, which is provided with a handle at its upper end, and which has suitable stop-pins G extending through it for the purpose of regulating its vertical movement. Secured to the lower end of this rod E is a screw-rod D, which passes freely through the upper part of the vertically-moving block A, which is placed between the two guides B, and which block A is fastened to the lower end of the rod E, so as to move therewith by means of the nut N on the screw D.

Extending downward from the block A are the two prongs or extensions Q, and between these two prongs Q is placed the vertically-adjustable block C, through which the screw D passes, and which is held in position between the two prongs Q in all of its movements by the guides R, which catch in the grooves in the edges of the block, as shown in Fig. 2. By revolving the rod E the block C will move either up or down upon the screw D, and thus regulate the amount of fertilizer that is to be dropped. When the rod E is raised as far as one of the lower stop-pins G will allow, a quantity of fertilizer in the hopper drops between the two guides B and between the top portion of the block A and the block C, and then when the rod E is depressed these blocks A C are forced down through the bottom of the hopper and the fertilizer between the two drops to the earth. The distance the block C is moved up or down upon the screw D regulates the amount of fertilizer that is to be fed at each stroke. As the operator walks along, the lower ends of the guides B are brought in contact with the earth at any desired point, and then as the rod E is depressed the fertilizer is dropped, and as the operator moves on the rod E is raised, so that another charge of fertilizer will drop between the blocks.

Having thus described my invention, I claim—

In a fertilizer-distributer, the combination of a supporting-frame consisting of two vertical posts having guides near their lower ends, a block sliding between the guides, having a vertical screw-threaded aperture, a vertically-moving rod placed between the posts, having a handle at its upper end and a screw-threaded lower portion which passes through the said block, a block stationarily secured to the said rod above the first said block, whereby the lower block can be adjusted in relation to the upper block by revolving the said rod, and a hopper secured to the posts, substantially as shown and described.

In testimony whereof I affix my signature in presence of two witnesses.

JNO. G. McKETHAN.

Witnesses:
T. J. WIMBERLY,
J. D. WIMBERLY.